United States Patent [19]

Mackey

[11] 3,848,346

[45] Nov. 19, 1974

[54] PROCESS OF PREPARING SKELETAL-VASCULAR CASTS

[76] Inventor: Walter J. Mackey, 1991 Sharondale Ave., St. Paul, Minn. 55113

[22] Filed: Sept. 6, 1973

[21] Appl. No.: 394,758

[52] U.S. Cl. .................................... 35/20, 35/17
[51] Int. Cl. .......................................... G09b 23/30
[58] Field of Search ................... 35/17, 20; 156/57

[56] References Cited
UNITED STATES PATENTS
3,780,452  12/1973  Jackson ................................ 35/20
FOREIGN PATENTS OR APPLICATIONS
450,350  7/1936  Great Britain Primary Examiner—Harland S. Skogquist

[57] ABSTRACT

A process for the preparation of skeletal-vascular casts of animal specimens wherein a curable synthetic resinous fluid is injected into the arterial and/or venous vasculature structure of the specimen, and thereafter permitted to harden into a cured rigid mass. The outer skin of the specimen is removed from the flesh, the specimen dried, and thereafter wrapped in a generally rigid perforate enclosure, whereupon the wrapped specimen is placed into contact with a colony of flesh-eating insects, such as Dermestes beetles. Contact is maintained with the beetles until the flesh is substantially entirely removed, whereupon contact is terminated, and the remaining portions are cleaned, bleached, and mounted on a suitable display panel.

10 Claims, 3 Drawing Figures

PROCESS OF PREPARING SKELETAL-VASCULAR CASTS

BACKGROUND OF THE INVENTION

The present invention relates generally to the preparation of skeletal-vascular casts of the articulated skeletal structures of animals including man, other mammals, or birds, with the cast including the articulated skeletal structure as well as the plastic cast of the arterial and/or venous vasculature portion. The process of the present invention includes injecting a curable synthetic resinous fluid into the blood vessels of an exsanguinated animal, and thereafter curing the resinous material into a generally rigid mass. The skinned flesh-containing specimen is then wrapped in a rigid perforated wrapping, and thereafter placed in contact with flesh-eating insects such as Dermestes beetles.

In the teaching of anatomy and other of the related sciences, there is a substantial need for new and more detailed anatomical teaching aids. Three-dimensional models are found to be extremely helpful, and particularly models which will accurately present the various relative relationships of the skeletal structures and their spatial relationships to the vascular structures. Obviously, it is desirable to utilize casts of this type which are obtained from actual specimens.

The process of the present invention may be used to prepare skeletal-vascular casts from virtually any species of animal, bird, fish, or reptile which has vascular channels and which are sufficiently large so as to permit injection with a curable synthetic resinous fluid. Casts so prepared are, of course, extremely accurate representations of the skeletal and vascular anatomy of the species, inasmuch as they are obtained from the actual bodies of the individual vertebrates. Accordingly, casts prepared pursuant to the technique of the present invention are of significant value to those academicians engaged in the teaching of such sciences as anatomy, zoology, biology, or the like. Furthermore, the casts are of significant value to teaching at virtually any academic level.

Studies of animal and/or human anatomy have traditionally been either by the disection of cadavers, the study of drawings, skeletons and textbooks, or by a study of models prepared to disclose portions only of skeletal or vascular systems. Recently, synthetic plastic or plaster models of various portions of the body structure have become available for anatomical studies, with these models, for the most part, illustrating only general likenesses to the structures which they supposedly represent. They are, accordingly, lacking in the fine structural details which are frequently found to be of great value to academicians or teachers of the anatomical sciences.

With regard to vascular casting, certain investigators have utilized the process of corrosion casting of vascular patterns of various organs or parts of the human or animal body. Traditionally, wax, latex rubber, or other similar material would be injected into the vascular channels, with the tissues thereafter being removed by immersion of the injected member in a solution of a strong acid or the like. The acid was utilized to remove the flesh as well as the skeletal structures, leaving only the injected material which previously had filled the lumen of the vascular structures. While this technique may provide an accurate cast of the vascular pattern of the organ, the spatial relationships to the skeletal structure are not obtained. This was generally accepted as an ultimate limitation, since it was believed that there was no suitable way to corrode away overlying tissues of corrosion casts without destroying the skeletal structure as well.

While the Dermestes beetle has been used by biologists for the removal of flesh from skeletal structures in the past, until the present invention, it was not considered possible to successfully inject the vascular channels of an entire animal, and thereafter corrode away the tissues leaving the skeletal structure intact, along with the vascular cast. The series of steps involved in the process of the present invention has rendered this feature possible.

SUMMARY OF THE INVENTION

In accordance with the present invention, therefore, the skeletal-vascular casts of animal specimens are made involving the following basic steps:

A. A curable synthetic resinous fluid is injected into an exsanguinated animal;
B. The outer skin is removed from the flesh, and the carcass is permitted to dry;
C. The dried specimen is wrapped in a generally rigid perforate wrapping so as to preserve the configuration and relative dispositions of portions of the specimen;
D. The wrapped specimen is placed in contact with a colony of flesh-eating insects; and
E. The specimen is removed from contact with the insects when the flesh is substantially entirely removed or eaten away, at which time the specimen is cleaned and bleached.

If desired, the specimen may be mounted upon a suitable base in order to provide a movable support.

Therefore, it is a primary object of the present invention to provide an improved process for the preparation of skeletal-vascular casts of articulated skeletons and vascular structures of animals.

It is a further object of the present invention to provide an improved technique for the preparation of skeletal-vascular casts of animal specimens wherein the finished specimen provides an accurate relationship between the relative dispositions of the skeletal structure and the vascular structure.

It is yet a further object of the present invention to provide an improved technique for the preparation of skeletal-vascular casts of animal specimens wherein the structure is prepared by corrosion techniques while retained within a generally rigid perforate wrapping.

Other and further objects of the present invention will become apparent to those skilled in the art upon a study of the following specification, appended claims, and accompanying drawings.

DESCRIPTION OF THE PREFERRED EMBODIMENT

In order to best disclose the process of preparing skeletal-vascular casts, the following technique is described.

Initially, the live animal is anesthetized by conventional techniques. A cut-down is made over one of the major arteries, and a catheter is placed in this vessel in a direction toward the heart. The catheter is ligated into that position for exsanguinating the animal. While the arteries are preferred, it will be appreciated that major veins may be employed with similar results.

The animal is allowed to completely bleed out through the catheter, and when exsanguinated, a predetermined amount of a colored solution of cold-setting liquid synthetic resinous material is injected into the blood vessel through the same catheter by which the animal was exsanguinated. The amount of material to be injected is based upon the body weight of the animal as well as the degree of perfusion desired, with a quantity of approximately 600 cc of synthetic resinous material being deemed proper for injection into a dog having a live weight of 20 pounds. A similar relationship will, of course, exist for other specimens.

While methylmethacrylate has been found to be most desirable for a material to be injected, it will be appreciated that various other acrylic or vinyl plastic substances may be employed. Generally speaking, the plastic utilized for injection should have the following physical and chemical properties:

1. The material preferably reacts reasonably slowly with time and by polymerization, is transformed from a viscous liquid into a generally strong, rigid, self-supporting material having modest flexibility.

2. The material should preferably have a viscosity which can be controllably varied.

3. The shelf-life or tray-life of the working solution should be sufficient to permit adequate time for injection without significant change in viscosity during the injection process.

4. The injection mass should neither impregnate the walls of the cavities to be filled, nor should the mass be significantly miscible with water.

5. The material should have only a small volume change upon solidification or polymerization.

6. The injection mass should be easy to work, and resistant to normal corrosive agents.

Preferably, injection pressures of up to about 60 pounds per square inch are utilized. This injection pressure is slowly increased until the 60 pounds per square inch is realized. Pressures in substantial excess of about 60 pounds per square inch have been found to create some problems with vessel rupture. During the injection process, it is important that air be excluded from the system so as to avoid introduction of bubbles into the vessels to be filled. Bubbles, when present, will form weakened portions or flaws in the hardened plastic substance.

Figure 1:
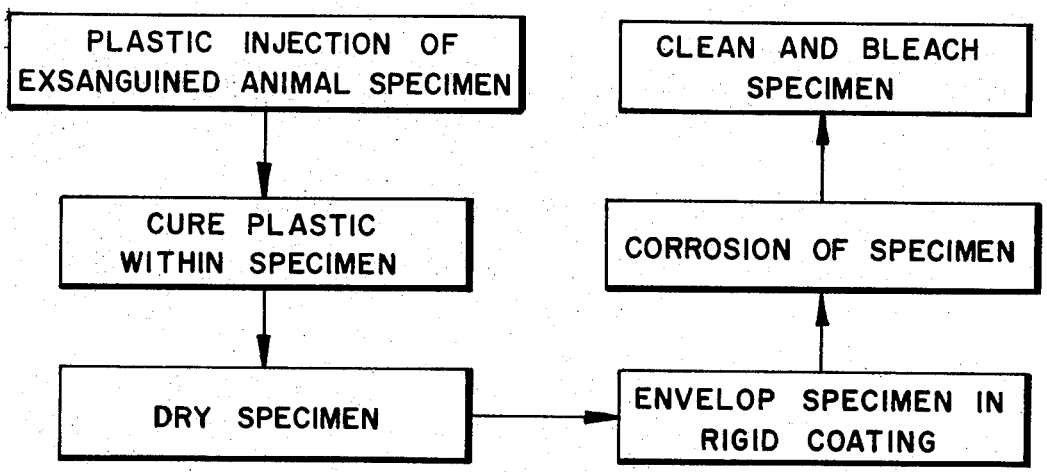
FIG. 1 is a flow diagram illustrating the various basic steps involved in the process of the present invention.
Figure 2:
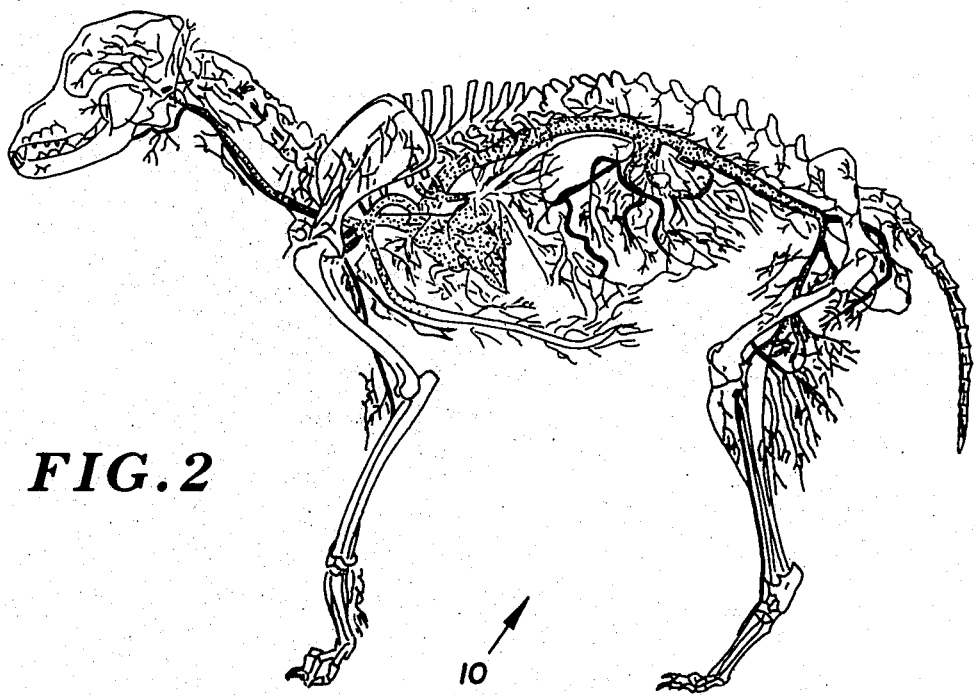
FIG. 2 is a side elevational view of a skeletal-vascular cast of a dog, and showing the articulated skeleton and vasculature structure of the animal as prepared pursuant to the process of the present invention.
Figure 3:
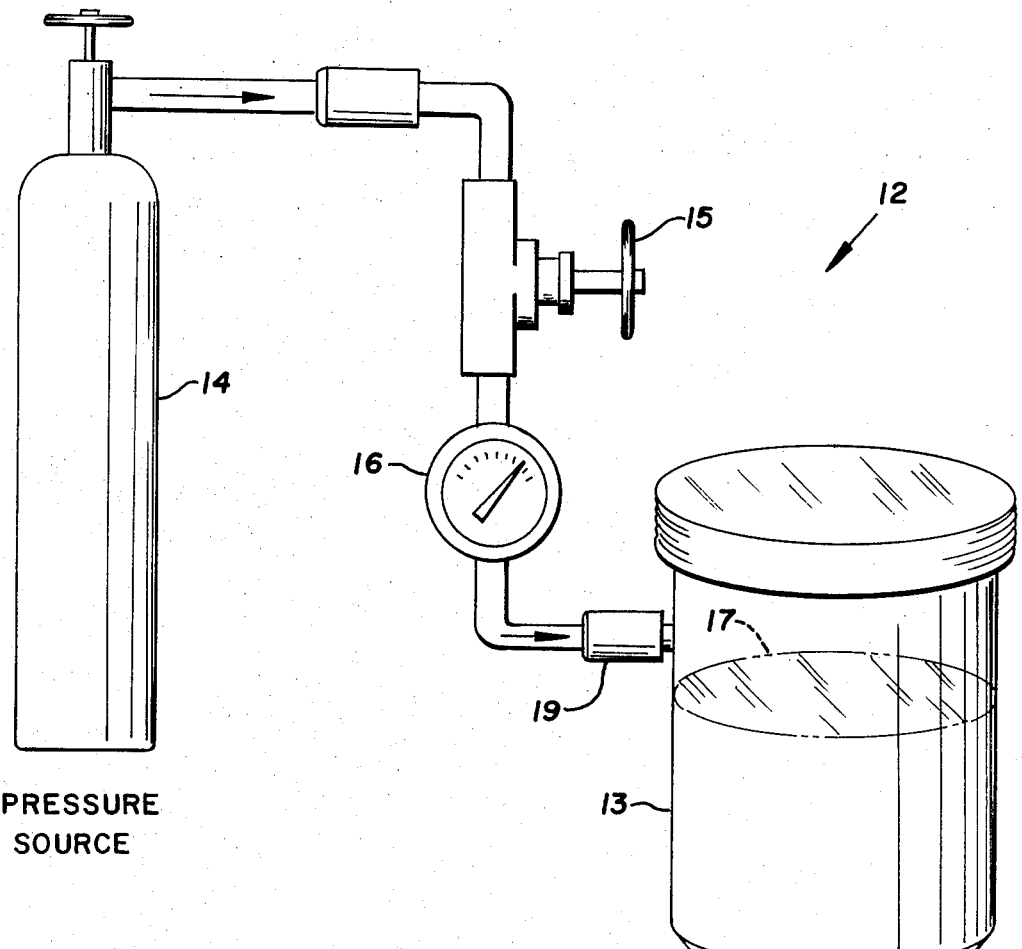
FIG. 3 is a schematic diagram of the apparatus utilized for injection of fluid into an exsanguinated animal specimen.

One injection system which has been found useful in connection with the process of the present invention is illustrated in FIG. 3 of the drawings. This system may be employed in order to prepare the skeletal-vascular cast generally designated 10, and illustrated in FIG. 2. Specifically, the injection system generally designated 12 includes a reservoir 13 to retain the synthetic resinous fluid to be injected into the exsanguinated animal. In order to provide the pressure and force necessary, a pressure vessel 14 is illustrated, wherein its output is directed through a pressure regulator 15, which can be read off of gauge 16, and which, in turn, is present over the plastic material 17 retained within reservoir 13. An inlet in the form of a quick-release coupling is illustrated at 19, which is utilized to provide an orifice through which the high pressure fluid can be directed to the reservoir.

The outlet from the reservoir, such as in the orifice 20, is provided with an adaptor element to permit attachment of the tapered catheter 22, with this tapered catheter being utilized for direct coupling to the vascular tree, as illustrated at 23. With this system, therefore, it is possible to achieve exsanguination of the animal through the tapered catheter, and once this procedure has been completed, the tapered catheter is coupled to the supply of resin retained within the reservoir, and the injection process is undertaken and completed.

As has been indicated, methylmethacrylate polymers are generally preferred, with such materials being curable with conventional chemical catalysts. These polymers are desired from the standpoint of ultimate flexibility, resistance to conventional corrosion materials, and their immiscibility with water.

Following completion of the injection operation, the injected animal is placed on its side on a flat tray and positioned thereon as if it were in a normal standing position. At this point, it is desirable to position the animal properly since once the plastic material present in the vessels becomes hardened, the position of the body may thereafter only be slightly altered without risking danger of breaking the plastic cast previously formed within the vasculature structure. After allowing an adequate time for the plastic to polymerize and harden, such as, for example, 24 hours under standard room conditions, the skin of the animal specimen is carefully removed. Again, care must be taken during this portion of the procedure in order to prevent excessive movement of the limbs or other extremities, which could fracture the polymerized plastic present within the vasculature structure.

In order to prevent or reduce putrefaction of the tissues of the injected animal while the specimen is in the beetle corrosion stage, it is preferable to dehydrate the animal tissues very carefully. The drying is accomplished in a conventional oven or incubator at a low heat level, such as at about 150° F. This drying process may require from 1 to 3 weeks depending upon the original size of the animal specimen and the amount of fatty tissue present. The animal specimen is placed on a flat tray, preferably superimposed over layers of an absorbant tissue such as conventional newspaper or the like. The tissue is deemed helpful to absorb fat drippings or the like which may result during the drying operation. In order to assist in accelerating the drying operation, it may be helpful to form an opening in the ventral abdominal wall to permit air flow. Furthermore, it is also helpful to remove as much excess subcutaneous animal fat in order to facilitate more rapid drying. During the drying process, the animal specimen should be observed, and removed from the drying oven when the tissues are sufficiently dry to the touch, and no longer feel spongy. While it is normally not troublesome if a specimen is over-dried, the consequences of under-drying are serious in that the skeletal portion of the specimen may decompose or otherwise disintegrate during the corrosion process.

THE COATING OPERATION

As has been indicated, the placing of a hard exterior coat of structural material around the dried specimen is an important feature of the process, and enhances the skeletal corrosion operation. The material preferably utilized is a hard exterior coat of plastic substance, such as fiberglass or the like in a synthetic resin binder, which is utilized to wrap the entire dried specimen. The use of the hard exterior coating serves a number of useful purposes, among these being the following:

1. Movement of the specimen during later handling operations is substantially prevented.
2. The animal specimen may be handled without damage during the corrosion and mounting steps.
3. External support is provided in order to prevent the skeleton from disintegrating, or becoming detached, in part, during the corrosion operation.

The coating, in other words, renders it possible to maintain integrity of the specimen during subsequent steps and operations, each of which may require substantial manual manipulation.

The coating process is conducted in accordance with the following description. Initially, the entire dried animal specimen is wrapped with several layers of strips of a generally water-impermeable film, such as polyethylene or the like. Two mil polyethylene has been found desirable for most animal body specimens. Each individual limb is separately wrapped with the polyethylene material, with the material being over-wrapped with a woven substance such as cotton gauze. Several layers of cotton gauze strips are preferably employed. The specimen is then coated with several coats of fiberglass-containing polyester resin, or other structural coating material. This coating material is then permitted to cure, becoming hard in a period of, for example, 12 hours or less. Strips of the hardened coating are then removed along areas covering the side of the body, the head, and the limbs. This partial removal is performed in order to permit access to the animal body specimen for the beetles, and for the introduction of cleaning chemicals during later steps in the process.

THE CORROSION OPERATION

In order to overcome the disadvantages encountered in the use of chemical corrosion, the flesh portion of the animal body specimen is removed by the use of flesh-eating beetles. Dermestes beetles are, of course, suitable for this purpose. This corrosion operation is carried out in a conventional fashion as described hereinbelow.

The dried and coated specimen is placed in a corrosion box containing a colony of Dermestes beetles, generically known as Dermestes vulpirus. A one-inch layer of sawdust or wood chips is preferably maintained in the bottom of the box containing the colony along with a quantity of moist cotton or the like utilized to provide the necessary moisture for optimum colony growth. In order to maintain the beetle colony active and viable, young beetle larva are raised from small seed colonies, and are constantly added to the corrosion colony.

The working colonies are maintained preferably in a darkened room, as the insects have been found to work more rapidly in the dark. The room is maintained at normal temperatures and relative humidity. Normally, the specimen should be examined daily in order to note the progress of flesh removal, and in order to avoid over-corroding the animal specimen. As the joints between the bones begin to appear on the specimen, a small amount of clear epoxy glue, or other rapidly curing material is applied to hold the bones in proper relative disposition, one to another. Since these beetles will consume the muscular tissue initially, and leave the connective tissue and ligaments until substantial removal of the muscular tissue, care must be exercised to remove the specimen from the colony at the proper time. This time is readily ascertained as being prior to the consumption of connective tissue. It has been found that a period of about 60 days provides desirable results in the corrosion operation.

CLEANING AND BLEACHING OPERATION

Following the removal of the corroded specimen from the corrosion box containing the beetle colony, a series of cleaning steps are performed. Initially, the specimen is washed gently in warm water to remove residual tissue debris, insect debris, and residual insects. The washed specimen is then permitted to dry, and thereafter is placed in a vat containing a solution of 5 percent sodium hypochlorite for a period of from 2 to 10 minutes. The specimen is removed after the solution has dissolved and removed remaining tissue and insect debris. It is important that the specimen be removed from the solution after a period of no greater than about 10 minutes, since excessive exposure may cause irreparable damage to the bone and cartilage structure. Upon removal, the specimen is rinsed in water and permitted to dry.

Any loose skeletal joints are again glued with a polymerizable hardening glue such as epoxy resin or the like. When the structure is again intact, it is placed in a solution of 3 percent hydrogen peroxide for a period of 5 hours in order to accomplish bleaching, after which time the specimen is again dried and any loose skeletal joints are re-glued. The specimen is thereafter immersed in a solution of carbon tetrachloride or other degreasing solution for a period of approximately 1 hour. This exposure to degreasing solutions is performed for the purpose of removal of excess grease from the specimen, and is preferably conducted under the protective confines of a fume hood or the like. Following drying, the specimen is ready for mounting.

MOUNTING OPERATION

The mounting process involves securing the specimen in an upright standing position while supported by three or more rods. For the canine structure illustrated in FIG. 2, one support rod is placed under the lower jaw of the animal, a second supporting the major vessels in the abdominal area, and a third supporting the pelvic bones. The rods are cut to the proper length and bolted to the mounting base. The animal is then secured to the mounting support rods with a catalytically hardened glue such as epoxy or the like. The partially supported animal specimen is then secured or otherwise attached to the mounting base with a suitable material such as epoxy glue or the like, and the outer fiberglass protective envelope may then be removed. This removal is readily accomplished, and is performed by removal in small sections, preferably with a small rotary saw. As each portion of the protective coating or envelope is removed, more of the specimen is exposed, and at this time the newly exposed skeletal joints are given their final gluing. After the outer coating or envelope has been completely removed and the skeletal joints appropriately glued, the specimen is again rinsed with water and is dried. After drying, the specimen may be sprayed with a number of coats of clear acrylic spray or the like, and may thereafter be enclosed in a thermoplastic display box or the like.

In addition to utilizing the concept for canine specimens, it will be appreciated that the technique is suitable for application to virtually any species of animal, bird, fish or reptile having vascular channels which are sufficiently large to be injected with plastic. Examples of animal specimens which may be the subject of a skeletal-vascular corrosion cast are rats, guinea pigs, rabbits, cats, dogs, monkeys, turkeys, bovine, equine, as well as humans. Obviously, other species could be similarly treated.

I claim:

1. The method of preparing skeletal-vascular casts of the articulated skeleton and vasculature structure of an animal comprising the steps of:
   a. exsanguinating the animal;
   b. injecting a curable synthetic resinous fluid into the blood vessels of said exsanguinated animal;
   c. curing said curable synthetic resinous fluid into a generally rigid mass;
   d. removing the outer skin from the flesh of said animal;
   e. wrapping said skinned animal in a generally rigid perforated wrapping disposed about the outer surface of said animal;
   f. placing said wrapped animal into contact with a colony of flesh-eating insects and maintaining said contact until the flesh is substantially entirely removed, whereupon the specimen is removed from contact with said insects; and
   g. thereafter cleaning, bleaching, and removing said perforated wrapping from said animal.

2. The method of preparing skeletal-vascular casts as defined in claim 1 being particularly characterized in that said animal specimen is mounted upon a generally rigid support member following removal of said wrapping.

3. The method of preparing skeletal-vascular casts as defined in claim 1 being particularly characterized in that said curable synthetic resinous fluid is colored so as to render the substance substantially opaque.

4. The method of preparing skeletal-vascular casts as defined in claim 1 being particularly characterized in that said curable synthetic resinous fluid is added to the same vessel through which the animal is exsanguinated.

5. The method of preparing skeletal-vascular casts as defined in claim 1 being particularly characterized in that said wrapping comprises an initial layer of polyethylene film having an over-wrap of woven cloth disposed thereon, and wherein the over-wrap cloth is coated with a layer of generally rigid material so as to render said wrapping rigid.

6. The method of preparing skeletal-vascular casts as defined in claim 1 being particularly characterized in that portions of said wrapping are removed in order to render the wrap perforate.

7. The method of preparing skeletal-vascular casts as defined in claim 1 being particularly characterized in that said synthetic resinous fluid is methylmethacrylate.

8. The method of preparing skeletal-vascular casts as defined in claim 1 being particularly characterized in that said flesh-eating insects are Dermestes beetles.

9. The method as defined in claim 1 being particularly characterized in that said curable synthetic resinous fluid is injected into the blood vessels of the exsanguinated animal at a pressure of substantially 60 psi.

10. The method as defined in claim 9 being particularly characterized in that said injection pressure is slowly increased until substantially 60 psi is reached, wherein said increase occurs over a period of approximately 1 to 3 minutes.

* * * * *